Patented May 2, 1950

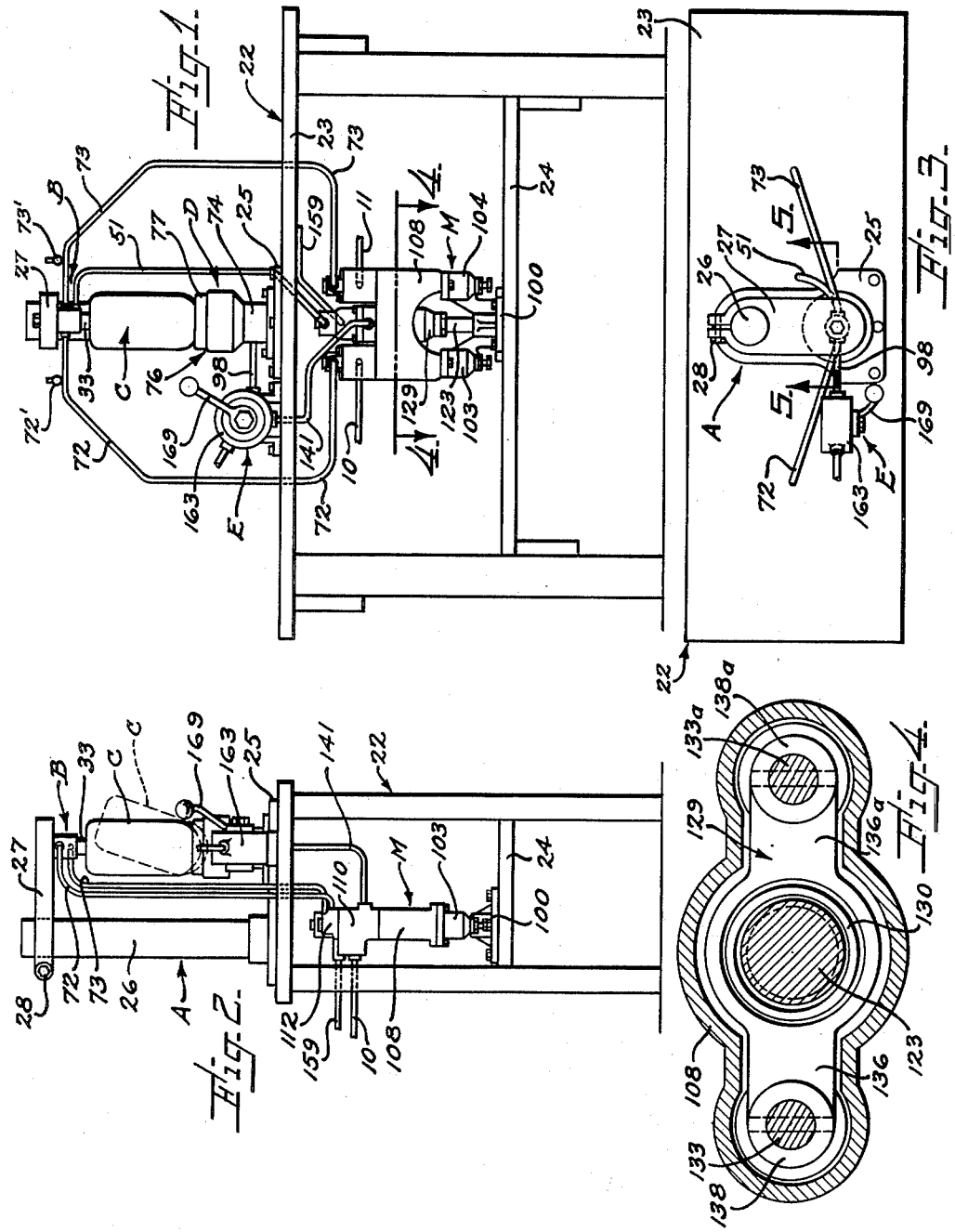

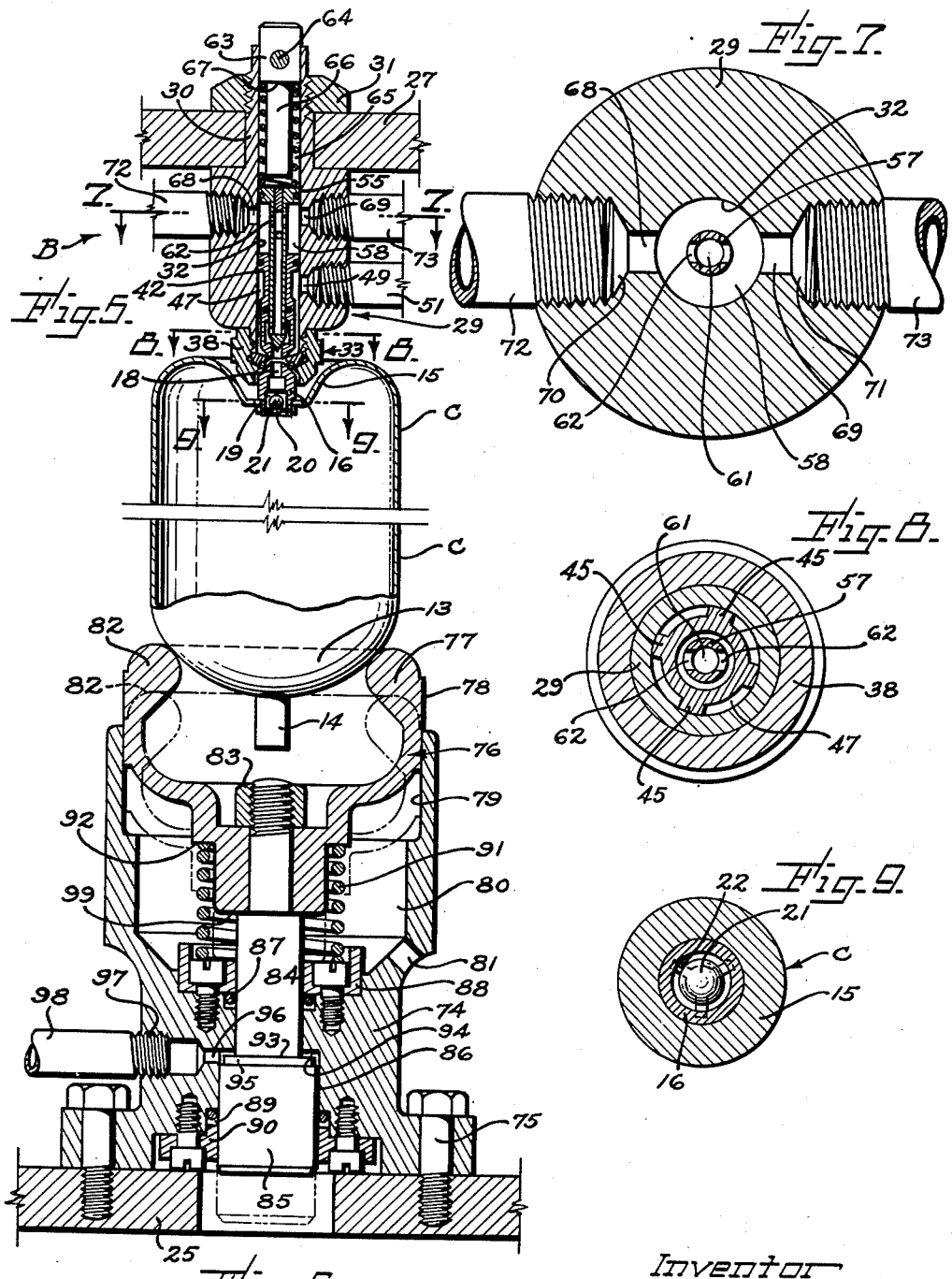

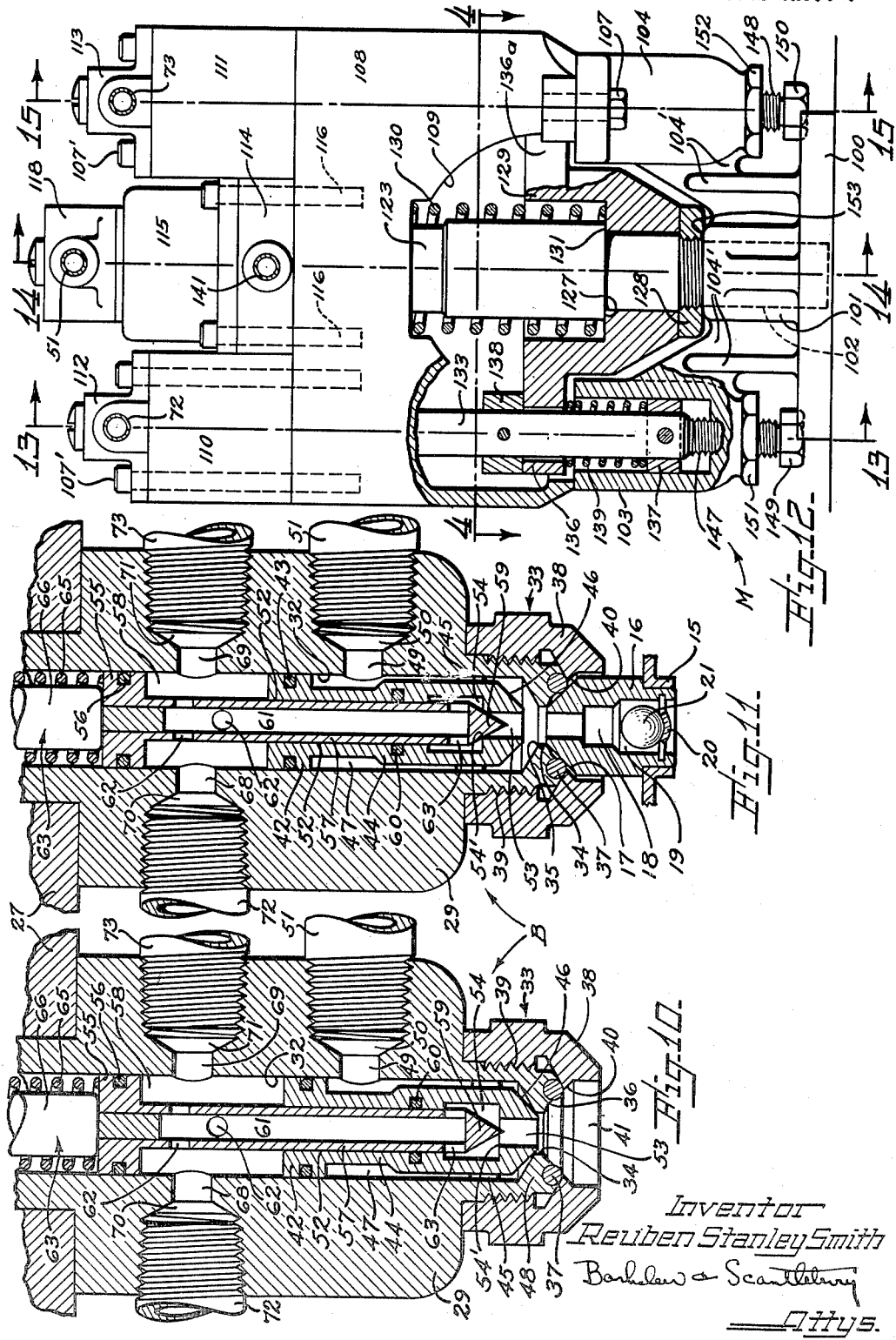

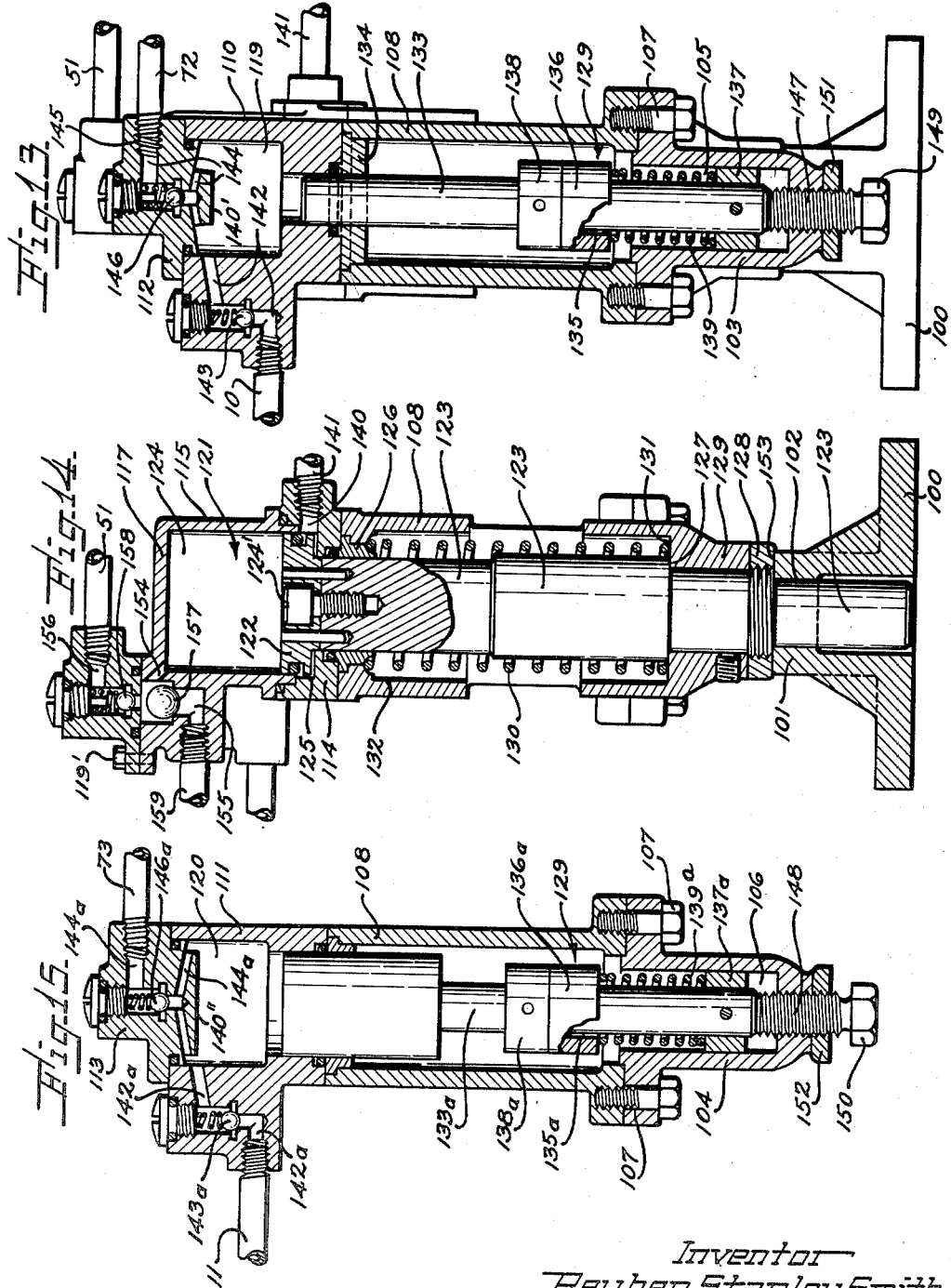

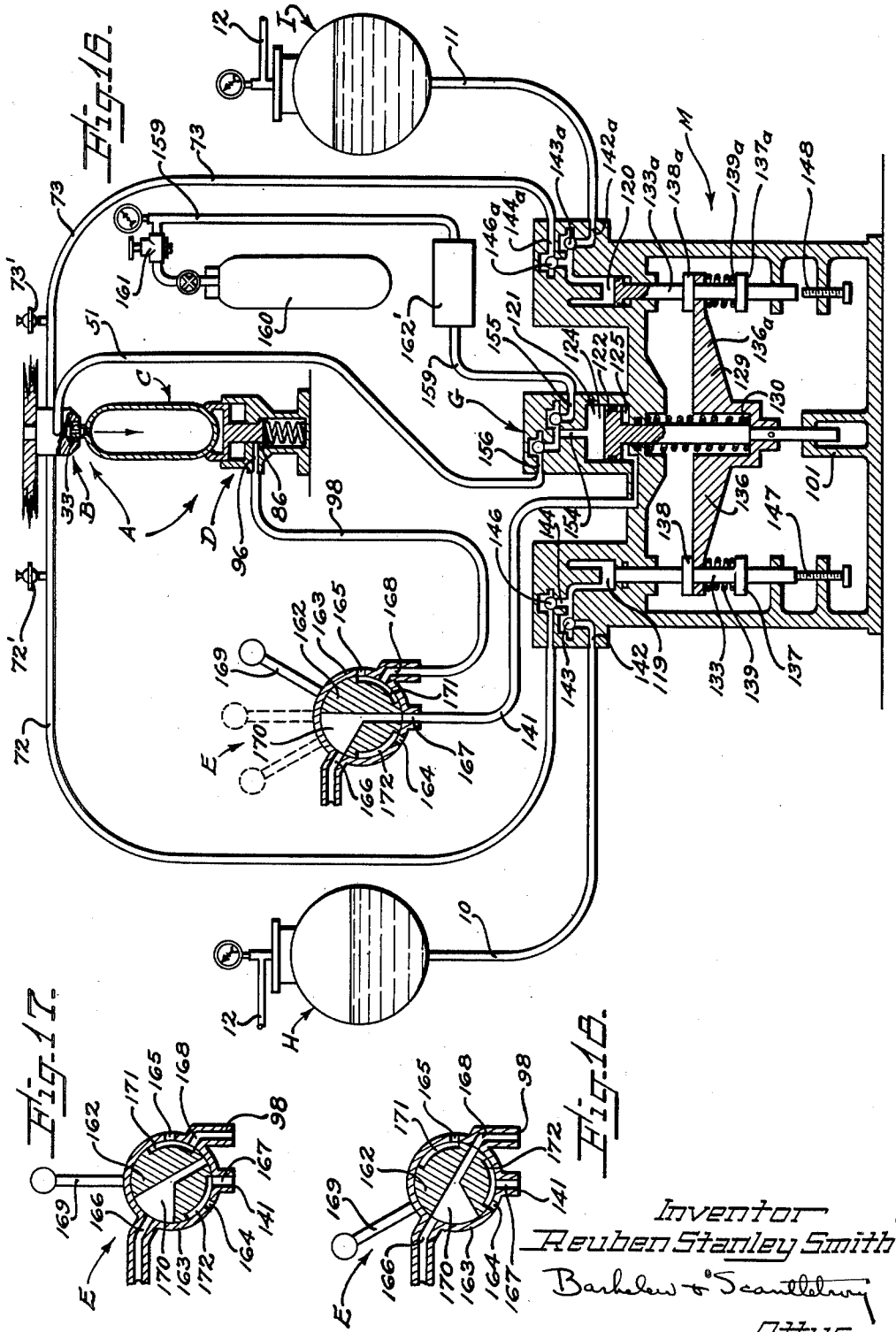

2,505,799

UNITED STATES PATENT OFFICE 2,505,799

FILLER HEAD WITH FLUID PRESSURE OPERATED VALVE AND DISCHARGE ORIFICE CLEAR OUT MEANS COMBINED WITH FLUID METERING MEANS

Reuben Stanley Smith, Altadena, Calif., assignor, by decree of distribution, to Jessie F. Smith Application June 22, 1945, Serial No. 601,009

12 Claims. (Cl. 226—100)

This invention has to do generally with filling machines and is more particularly concerned with machines for delivering measured amounts of liquid to relatively small containers presented to it successively.

Though not at all limited thereto, the machine is particularly well adapted to the packaging of liquids, such as sesame oil and pyrethrum, used in admixture with dichlorodifluoromethane to produce so-called "aerosol pesticide bombs." The relatively stable oil and pyrethrum are ordinarily delivered to the containers during one stage of operation while the relatively volatile dichlorodifluoromethane is added later. In my copending application entitled "Filling machine (A)" filed June 23, 1945, Serial No. 601,134, I have described a filling machine particularly well adapted to the delivery of dichlorodifluoromethane to the containers, and certain of the structural and control features, described and claimed in that application, are applicable likewise to the present machine. However, there are additional features in the present machine rendering it peculiarly adaptable to the handling of relatively stable oils and extracts.

I will proceed to describe the machine as put to this particular use so the significance of certain features may be emphasized by calling attention to specific characteristics of the liquids being handled, but this is in no way to be considered as limitative on the claims appended herein. I have also shown the preferred embodiment of the invention as including means for introducing two liquids simultaneously to a single container, thus speeding up the delivery operation, but it will be understood that certain broad aspects of the invention are fully applicable where only a single liquid is being handled, and such claims as do not include the duplex arrangement are to be considered as contemplating a "single-liquid" arrangement.

It is among the major objects of the invention to provide a machine which is capable of rapid operation and yet one which delivers an extremely accurately measured amount of liquid each time it is operated.

The machine includes a releasable, container-supporting arrangement having a filling head with a delivery nozzle adapted to register with the filling opening of the container, and a meter connected to a liquid source and to the filling head. The meter is adapted to discharge equal, measured amounts of liquid to the containers as they are successively presented to the head.

The exactness of the amount of liquid delivered to each container is a critical factor in connection with the operation of a machine of this type. Furthermore, proportionate quantities must be kept close to specification. For instance a typical formula for an "aerosol bomb" calls closely for 90% dichlorodifluoromethane, 8% sesame oil and 2% pyrethrum, all percentages being by weight, and the amounts being computed at given base specific gravities. We are concerned here only with the delivery of sesame oil and pyrethrum and it will be seen that, in the typical formula given above, there is to be a delivery of four times as much, by weight, of sesame oil as of pyrethrum.

However, it is found in practice that the specific gravities of different batches of material individually vary from the base values, and therefore it becomes necessary to adjust the measuring mechanism to compensate for such variations. The meter of my device measures by volumetric displacement rather than by weight. The ratio of the specific gravities of the named substances is such that to satisfy the above formula, the meter must deliver about 3.91 times as much, in volume, of sesame oil as of pyrethrum. Then, to compensate for individual variations from the base specific gravities, the meter must be adjustable to vary individually the volumetric output of the two substances.

Accordingly, it is among the objects of the invention to provide means whereby the meter may be finely regulated to insure extreme accuracy of delivery in spite of possible variance in the characteristics of the liquid being handled, and, in the case of duplex delivery, that the two metering mechanisms, though powered from a single source, be adjustable individually in accordance with the individual characteristics of the two liquids.

The individual metering of the two liquids, as against mixing the liquids and then metering the admixture, allows an accurate, individual check on the liquids at the point of delivery, and avoids the complication and inaccuracies arising by reason of the different specific gravities of the two liquids.

Also contributing to the accuracy of the metering, is the provision of means for bleeding off any air which may be entrained in the liquid during its transit to the meter, for it is obvious that if air be carried into the meter, there will be a corresponding decrease in the liquid delivery from the meter.

The liquids passing through the delivery nozzle are often of a character tending to clog the delivery orifice and thereby materially reduce, or even destroy, the efficiency of the machine. Such is true of pyrethrum which has a tendency to precipitate wax, especially under certain temperature conditions and when in admixture with other substances. Therefore I provide means which clears the delivery orifice of liquid after each delivery impulse. Preferably, the cleansing agent is a pressurized gas blown through the orifice and, where the liquid which is later to be introduced to the container may be readily transformed into a gas, it is preferable that this substance be utilized as the agent, for then no contaminating material is introduced to the container during the clearing operation. For instance, in the illustrative case, dichlorodifluoromethane is particularly well suited to the purpose.

As an added feature, though this is not essential to the invention, considered in its broader aspects, I utilize the meter-actuating mechanism in connection with the delivery of the clearing agent, but this, as well as other features and objects of the invention may be brought out better in connection with the following detailed description, reference being had to the accompanying drawings, in which:

Fig. 1 is a front elevation of a machine embodying my invention;

Fig. 2 is a side elevation of Fig. 1;

Fig. 3 is a top plan view of Fig. 1;

Fig. 4 is an enlarged, detached section on line 4—4 of Fig. 1;

Fig. 5 is an enlarged fragmentary section on line 5—5 of Fig. 3;

Fig. 6 is an enlarged, medial section through the clamp of the device;

Fig. 7 is an enlarged section on line 7—7 of Fig. 5;

Fig. 8 is an enlarged section on line 8—8 of Fig. 5;

Fig. 9 is an enlarged section on line 9—9 of Fig. 5;

Fig. 10 is an enlarged fragmentary view showing a part of Fig. 5 but with one of the valves in a different position;

Fig. 11 is a view similar to Fig. 10 but showing another valve in changed position;

Fig. 12 is an enlarged, detached elevation partly in medial section of the meter of my device;

Fig. 13 is a section on line 13—13 of Fig. 12;

Fig. 14 is a section on line 14—14 of Fig. 12;

Fig. 15 is a section on line 15—15 of Fig. 12;

Fig. 16 is a schematic view of the machine, its valves, and pipe connections;

Fig. 17 shows the control valve of Fig. 16 in changed position; and

Fig. 18 is a view similar to Fig. 17 but showing the valve in still another position.

Referring first to the schematic layout of Fig. 16, the machine includes a stand A for receiving and positioning container C and made up of delivery head B and holder or clamp D, meter M, control valve E, and meter-actuating and gas compressing device G. H and I represent tanks containing liquids which are to be simultaneously metered into containers, such as C, successively presented to head B. In the illustrative case, tank H contains pyrethrum and tank I contains sesame oil, and supply lines 10 and 11 for meter M extend from tanks H and I, respectively. Preferably, the tank liquid is pressurized by the application thereto of gas, such as compressed air, through lines 12.

Since frequent reference will be made to the application of different parts of the machine to containers which are being filled thereby, I will first describe a typical container, though it will be understood this is done solely for illustrative purposes and is not at all to be considered as precluding the use of my machine for filling containers having other characteristics.

Container C (Figs. 1, 5 and 11) is a cylindrical, metal bottle having a rounded end 13 with an initially sealed-off discharge neck 14 and a depressed end 15 carrying a filling fitting 16. Fitting 16 has a conical external seat 17, a filling bore 18 and a counterbore 19; the counterbore and retainer web 20 forming a cage for check-valve ball 21 adapted to admit liquid to the container and then to prevent reverse flow, especially when the container is subsequently internally pressurized.

The machine is mounted on a table 22 having a top 23 and a shelf 24. Stand A includes a base plate 25, secured to table top 23, a post 26, and a head plate 27 which is adjustable vertically along the post and is adapted, at 28, to be clamped in adjusted position.

Delivery head B (Figs. 5, 10 and 11) is in the form of a cylindrical body member 29 having a neck 30 extending through head plate 27, the body member being releasably clamped to the plate by nut 31. The body member has a central, axial bore 32 opening to nozzle 33 which has a delivery orifice 34. The upper, bounding edge 35 of orifice 34, forms a valve seat for a purpose to be described. A conical bore 36, substantially complementary to fitting-seat 17, opens downwardly and outwardly from orifice 34 and recessed into the wall of this bore, but projecting slightly into the bore, is a packing washer 37, preferably an O ring of resilient material such as "neoprene." A ring-cap 38 is threaded onto the body member at 39, and has a conical bore 40 which is, in effect, a continuation of bore 36, and a cylindrical bore 41. The ring cap 38 provides detachable means for holding seat-washer 37 in position, so the latter may readily be replaced after it becomes worn. Bores 40 and 41 are adapted to receive container-fitting 16 so orifice 34 and filling bore 18 are in registration and, by pressing the container upwardly, fitting-seat 17 may be tightly seated on washer 37 to form a tight seal between the container and fitting head.

Vertically slidable in bore 32 is a piston 42 provided with a seal-ring 43 and a depending stem 44 of reduced diameter. The lower portion of the stem is centered in bore 32 by radial fins 45 (Fig. 8), and the conical terminal 46 forms a closure or valve member for orifice 34, insofar as its communication with the annular, gas-chamber 47 is concerned. This gas chamber is annularly defined by stem 44 and the opposing peripheral wall of bore 32, and is longitudinally defined by piston 42 and the body wall 48 through which orifice 34 opens. A gas-inlet port 49 opens from chamber 47 and is enlarged at 50 to take pipe 51.

Piston 42 and stem 44 have an axially continuous bore 52 which opens to the top of the piston. The lower end 53 of the bore is preferably somewhat relatively restricted in diameter, and immediately above the restriction is a bore-portion of relatively large diameter which forms a chamber 54. A valve seat 54' is provided at the junction of chamber 54 and restriction 53.

Piston 55, provided with a seal-ring 56, is adapted to reciprocate through bore 32, the piston stem 57 being telescopically arranged with respect to piston 42 and stem 44, said stem 57 being slidable longitudinally through bore 52.

A liquid or mixing chamber 58 is longitudinally defined by pistons 42 and 55. The stem 57 is hollow, except at its lower end which is of solid, conical form to provide a valve member 59 adapted to engage seat 54' for closing chamber 54 from orifice 34. Stem 44 is packed off in bore 52 by washer 60. The central passageway 61 of the stem opens to chambers 58 and 54 at 62 and 63, respectively.

A positive stop for limiting the upward movement of piston 55, and hence of piston 42 due to engagement of seat 54' with valve member 59, is provided in the form of a plug 63 which projects into bore 32 and is pinned at 64 (Fig. 5) to body-neck 30. Spring 65 surrounds the reduced-diameter portion 66 of plug 63 and is interposed between plug shoulder 67 and piston 55. The spring tends constantly to depress piston 55 and thus, through stem 57, to depress piston 42 in a manner to engage valve members 59 and 46 with seats 54' and 35, respectively, thereby closing orifice 34 from both chambers 54 and 47.

Opening through body member 29 to chamber 58, are the diametrically opposite liquid-inlet ports 68 and 69, the communicating port-enlargements 70 and 71 taking pipes 72 and 73, respectively, which run to meter M.

Clamp D for applying container C to filling head B, includes a cup-shaped base 74 attached to base-plate 25 at 75 (Fig. 6) and a cylindrical elevator or air-lift 76 which is supported in base 74 for vertical reciprocation. Member 76 includes a cup 77 which is in vertical, axial alinement with nozzle 33, and has a cylindrical portion 78 which fits complementary bore 79 in base 74 to guide the cup in its vertical movement. The base cavity 80 is vented at 81.

The cup rim 82 is in-turned and rounded to take and center the rounded end 13 of container C, fitting 14 being held in the clear. Connected to cup 77 by nut 83 is a depending piston rod 84 carrying piston head 85, the latter being reciprocable through base-cylinder 86. Rod 84 is packed-off at 87, the packing being retained by ring 88 which surrounds the rod and is bolted to base 74. Head 85 is packed-off at 89, the packing being retained by ring 90 bolted to base 74.

A relatively heavy spring 91 is interposed between ring 88 and shoulder 92 on cup 77 and normally has sufficient effective force to press container fitting 16 into liquid-tight relation with the nozzle seat-washer 37. When the container is clamped to the filling head, there is vertical clearance between the annular, upper shoulder 93 of piston head 85 and the base-shoulder 94, but when there is no container in clamped position, these shoulders engage to limit the upward movement of the cup. By adjusting head plate 27 vertically along post 26, the effective force of spring 91, during such times as a container is in clamped position, may be varied.

The upper end 95 of piston head 85 is of reduced diameter and, opening to the cylinder bore 86 at a point opposite this reduced diameter when the cup 77 is up, is a horizontal air duct 96 which is enlarged and threaded at 97 to take compressed air supply pipe 98. At certain stages of operation, air is admitted through pipe 98 to cylinder 86 with sufficient effective force to depress piston 85 and hence cup 77 against the resistance of spring 91 (see dotted lines, Fig. 6) the extent of depression being limited by contact of cup shoulder 99 with ring 88. However, the allowed extent of cup-depression is sufficient to permit container C to drop clear of nozzle 33 and then to be withdrawn entirely from the filling machine for replacement by an empty container. The empty container, first held at an angle (dotted lines in Fig. 2) with its rounded end in cup 77, is straightened up to put fitting 16 in axial alinement with nozzle 33, and then the air under pressure within cylinder 86 is vented to the atmosphere. Thereupon, spring 91 elevates cup 77 and clamps the empty container to head B.

Meter M (Figs. 4 and 12 to 15) includes a base-casting 100 bolted to shelf 24. Casting 100 has a central, upstanding hub 101 with a vertical guide-bore 102, and cups 103 and 104, having vertical guide-bores 105 and 106, respectively. Webs 104' connect the cups, hub and base. Bolted at 107 to cups 103 and 104 is a hollow bridge member 108, open at top and bottom and curving upwardly at its central portion 109, as viewed in front elevation (Fig. 12).

Bolted at 107' to bridge 108 and in axial alinement with bores 105 and 106, are cylinders 110 and 111 and their respective heads 112 and 113. A central block 114 and cylinder 115 are bolted at 116 to bridge 108 in vertical axial alinement with guide bore 102, the cylinder 115 having an integral head 117 to which a valve housing 118 is bolted at 119' (Fig. 14). The bores of cylinders 110, 111 and 115 are indicated at 119, 120 and 121, respectively.

Piston head 122 is bolted to rod 123 at 124' and is adapted to reciprocate through cylinder bore 121. The bore-portion 124 above head 122 may be considered as a compression chamber, and that portion 125 below the head, as a compressed-air or lift chamber. Rod 123 extends downwardly through stuffing box 126 and into sliding fit with guide bore 102. Clamped to rod 123 between rod-shoulder 127 and nut 128 is a yoke 129, and a spring 130, acting between yoke-shoulder 131 and bridge shoulder 132, tends always to depress the yoke, rod and piston to the position of Figs. 12 to 15.

The displacement plungers and valvular arrangements associated with cylinders 110 and 111 are identical except that since, under the specifications of the illustrative case, the displacement plunger in cylinder 111, which is to handle the sesame oil, has double the effective diameter and therefore four times the effective cross-sectional area of the other displacement plunger. I will therefore describe only one valvular arrangement and one displacement arrangement in detail. I will apply similar reference numerals to corresponding parts but will follow the numerals applied to the elements of one of the units with the exponent "a."

Displacement plunger 133 extends from displacement chamber 119 through stuffing box 134 and through bore 135 in yoke arm 136. At its lower end the plunger carries a cylindrical head 137 which plays vertically through and is guided by the guide-bore 105. A central collar 138 is pinned to plunger 133 at a point above yoke-arm 136, and a compression spring 139 encircles the plunger and terminally engages the underside of the yoke arm and the upper side of head 137.

The upper limit of the plunger stroke (and hence of the yoke-stroke) is established by the end-stop 140' carried by cylinder head 112, but it will be noted that with the plunger 133 and rod 123 at the tops of their strokes, piston 122 will still be a little below cylinder head 117 so the compression chamber 124 is never completely occupied by piston head 122, for a reason later to be stated.

Opening to air chamber 125 (represented by the portion of bore 121 below piston 122) in an inlet port 140 adapted to take compressed-air pipe 141. Delivery pipe 10 leads to inlet passageway 142 which opens to the top of displacement chamber 119, a check valve 143 being interposed in the passageway. Outlet passageway 144 leads from the top of chamber 119 and through head 112, being enlarged at 145 to take the end of pipe 72 which leads to port 68 (Fig. 5) and thence to chamber 58 of delivery head B. A check valve 146 is provided in passageway 144. Pipes 72 and 73 have bleed valves 72' and 73' (Fig. 1) at their highest points so air entrained in the liquid may be bled off to maintain solid streams of liquid and thus insure full, metered delivery to the containers.

Delivery pipe 11 leads to inlet passageway 142a in cylinder 111, which passageway opens to the top of displacement chamber 120 in that cylinder, and outlet passageway 144a leads from that chamber and through head 113 to pipe 73, the latter opening to port 69 (Fig. 5) and chamber 58 of head D.

Extending upwardly into guide bores 105 and 106, respectively, are threadably adjustable stop screws 147 and 148 for plungers 133 and 133a, respectively. Screws 147 and 148 have external tool-taking heads 149, 150, and lock-nuts 151 and 152, respectively. The effective displacement strokes of the plungers 133 and 133a may be individually regulated by individual adjustment of their stop screws.

The down-stroke of piston rod 123, under the influence of spring 130, is limited by the engagement of yoke nut 128 with the shoulder 153 formed by the top of hub 101. The coincident downward movement of the yoke 129 acts through the yoke-arms 136 and 136a, springs 139 and 139a and heads 137 and 137a to depress plungers 133 and 133a. If these plungers strike their respective stops before the central plunger 123 and yoke 129 reach their downward limits (which will ordinarily be the case) yoke arms 136 and 136a merely compress springs 139 and 139a during the continued downward movement of the yoke.

Opening to compression chamber 124 in cylinder 115 is a gas passageway 154 having an inlet branch 155 and an outlet branch 156, there being check valves 157 and 158 in branches 155 and 156, respectively. Pipe 51, from port 49 and chamber 47 of head B (Fig. 5) connects to outlet 156, while pipe 159 extends to inlet 155. Pipe line 159 leads from a tank 160 of gas under pressure, there being an adjustable regulating or pressure-reducing valve 161 and a volume chamber 162' in the line. In the illustrative case, the gas in tank 160 is dichlorodifluoromethane, though this choice is not at all limitative, as was explained in the forepart of the specification.

A control valve, conventionally indicated at E (Figs. 16 to 18) is provided for controlling the compressed air utilized for operating clamp D and the meter-yoke 129. Valve plug 162 is rotatable within valve case 163, the latter having exhaust ports 164, 165, a compressed air inlet port 166, and outlet ports 167 and 168. Plug 162, rotatable by handle 169, has inlet passageway 170 and exhaust ports 171 and 172. Port 167 opens to pipe 141 which leads to chamber 125 in cylinder 115, and port 168 opens to pipe 98 which leads to clamp-chamber 86 (Fig. 6).

When control handle 169 is in its central or neutral position (Fig. 17) the air inlet passageway 170 is blanked off, pipe 98 is open to the atmosphere through ports 168, 171 and 165, and pipe 141 is open to the atmosphere through ports 167, 172 and 164. It follows that air chamber 86 is vented, and spring 91 is effective to clamp container C in the position of Figs. 1 and 5. It also follows that chamber 125 in cylinder 115 (Fig. 14) is vented, and spring 130 is effective to hold yoke 129 and plungers 133, 133a in the depressed condition of Figs. 12 to 15. Spring 65 is effective to hold pistons 42 and 55 down in the positions of Fig. 5, with valves 59 and 46 closed, against the upward force of gas delivered to chamber 47 from tank 160 through pipe 159, inlet 155, outlet 156 and pipe 51. For instance, assuming the dichlorodifluoromethane in tank 160 be at a temperature of 70° F. and its vapor pressure therefore about 70 lbs. regulating valve 161 may be set to deliver the vapor to chamber 47 at about 15 lbs. pressure, and a spring 65 is chosen which has sufficient effective force to well overpower the lifting effect of gas at this pressure as applied to the underside of stem 44.

Valve E is then turned to delivery position (Fig. 16), putting the entire system into the condition of that figure. The clamp chamber remains vented as before, but exhaust port 164 is now blanked, and air inlet port 166 is put in communication with pipe 141 through passageway 170 and port 167. Compressed air is thus admitted to chamber 125 in cylinder 115 and piston 122 is forced upwardly, carrying with it yoke 129 and plungers 133, 133a (Fig. 1). The plungers pressurize the liquid in chambers 119, 120, pipes 72, 73, and chamber 58 wherein the two liquids are mixed. The pressure in chamber 58 raises piston 55 against the force of spring 65 and thus elevates valve member 59 from its seat 54' (Fig. 10) admitting liquid to the container through chamber 58, ports 62, passageway 61, chamber 54, bore 53 and orifice 34. Stop 63 limits the upward movement of piston 55.

While piston 122 is thus rising, it compresses the gas in chamber 124, but not to an extent which will lift stem 44 from seat 35, said stem being pressed firmly to seat by the liquid pressure in chamber 58 and imposed on piston 42. The liquid displaced from metering chambers 119 and 120 by the time plungers 133 and 133a strike their respective stops 140', 140a'', represents delivery to the container of the predetermined charges of liquid from tanks H and I, less a small amount which is accounted for later. When the yoke and plungers come to rest at the tops of their strokes, the pressure within chamber 58 quickly drops, spring 65 depresses piston 55 and starts stem-valve 59 towards its seat 54', forcing the balance of the predetermined amount of fixed liquid into the container.

During the upward movement of yoke 129 and rod 123, the pressure of the gas in chambers 124 and 47 has been built up by piston 122 to a value which is sufficient, as soon as the liquid pressure in chamber 58 drops, to lift piston 42 and raise valve 46 from its seat 35 (Fig. 11) whereupon the pressurized gas blows from chamber 47 through orifice 34 and clears the latter of any liquid or deposit therefrom which may be tending to clog it. By regulation of valve 161 the effective pressure for blowing the orifice clear, may be varied to suit different clogging ferent liquids.

The combined volume of chamber 124 (when piston 122 is at the top of the stroke), pipe 159 and chamber 162' is preferably approximately equal to the volume of the liquid displaced from cylinder 120, this proportioning of volumetric capacities giving a proper degree of gas compression to suit usual needs.

When the meter reaches the end of its upstroke, the operator returns control handle 169 to the position of Fig. 17, it following that the motivating air pressure from line 141 is cut off and all elements return to the neutral condition originally described, though the clearing gas may continue to blow through orifice 34 during descension of the meter yoke. However, as soon as the gas has lost its excess pressure by flow into container C, spring 65 is effective to return the valves in the delivery head B to the positions of Fig. 5.

The operator then swings control handle 169 to the position of Fig. 18. This leaves chamber 125 vented to the atmosphere, but admits compressed air to clamp chamber 86 through port 166, passageway 170, port 168, pipe 98, and duct 97, thus depressing piston 85 and cup 77 against the action of spring 91 and allowing the full container to be replaced by an empty one. Handle 169 is then returned to the neutral position of Fig. 17, venting clamp chamber 86 to the atmosphere and allowing spring 91 to thrust the container upwardly into clamped relation to head B. The machine is then in condition for a repetition of the cycle.

Since valve E cannot be turned to a position simultaneously delivering compressed air to both clamp cylinder 86 and meter cylinder 125, it is not possible to release clamp D, through actuation of valve E, so long as head B is delivering liquid to container C.

While I have illustrated and described a preferred embodiment of my invention, it is understood various changes in design, structure and arrangement may be made without departing from the spirit and scope of the appended claims.

I claim:

1. In a machine for filling a container with a liquid through a filling opening in the container, a filling head having an inlet and a delivery orifice, there being a passageway in the head connecting the inlet and the delivery orifice, said head being adapted to be associated with the container with the delivery orifice and filling opening in registration, a valve in said passageway to control liquid flow therethrough, there being a gas chamber associated with said passageway; said valve comprising a seat member and a stopper member relatively movable into and out of mutual engagement, the valve being closed when said members are in mutual engagement and being open when they are out of such engagement, said members being bodily movable as one while in such engagement to open the gas chamber to the orifice, means normally and yieldably holding the members against relative and bodily movement, controllable means to open the valve, a piston on said valve and exposed within said gas chamber, and means for supplying gas under pressure to said chamber after the valve is subsequently re-closed and thereby moving said members bodily whereby gas from said chamber is expelled through the orifice while the valve is closed.

2. In a machine of the character described, a filling head having a delivery orifice, there being a passageway in the head and in communication with the orifice, a valve seat in the passageway, the passageway being formed to include a head bore at the side of the seat remote from the orifice, a tubular piston movable axially through the bore, a tubular stem carried by said piston, a valve member on said stem, said piston and stem being movable to and from a position engaging said valve member with said seat, the bores of the piston and stem being axially continuous and opening to opposite ends of the piston and stem, said stem being of reduced diameter to define, with the head-bore wall, an annular gas chamber which is in communication with the orifice when the valve member is out of seat-engaging position, there being a gas inlet to said chamber, an internal valve seat in the stem bore and there being a chamber in the stem above the seat; a second piston in the head bore and axially spaced from the first piston, the two pistons and the head-bore wall defining a liquid chamber, there being a liquid inlet opening to the liquid chamber, a stem carried by the second piston and slidable through the bores of the first piston and its stem, and a second valve member carried by the second stem and movable with respect to the first piston to and from a position engaging said internal seat, there being a passageway in the second stem opening at one point to said liquid chamber and at another point to said stem chamber.

3. In a machine of the character described, a filling head having a delivery orifice, there being a passageway in the head and in communication with the orifice, a valve seat in the passageway, the passageway being formed to include a head bore at the side of the seat remote from the orifice, a tubular piston movable axially through the bore, a tubular stem carried by said piston, a valve member on said stem, said piston and stem being movable to and from a position engaging said valve member with said seat, a spring acting normally and yieldingly to hold said valve member in seat-engaging position, the bores of the piston and stem being axially continuous and opening to opposite ends of the piston and stem, said stem being of reduced diameter to define, with the head-bore wall, an annular gas chamber which is in communication with the orifice when the valve member is out of seat-engaging position, there being a gas inlet to said chamber, an internal valve seat in the stem bore and there being a chamber in the stem above the seat; a second piston in the head bore and axially spaced from the first piston, the two pistons and the head-bore wall defining a liquid chamber, there being a liquid inlet opening to the liquid chamber, a stem carried by the second piston and slidable through the bores of the first piston and its stem, and a second valve member carried by the second stem and movable with respect to the first piston to and from a position engaging said internal seat, there being a passageway in the second stem opening at one point to said liquid chamber and at another point to said stem chamber.

4. In a machine of the character described, a filling head having a delivery orifice, there being a passageway in the head and in communication with the orifice, a valve seat in the passageway, the passageway being formed to include a head bore at the side of the seat remote from the orifice, a tubular piston movable axially through the bore, a tubular stem carried by said piston, a valve member on said stem, said piston and stem being movable to and from a position engaging said valve member with said seat, the bores of the piston and stem being axially continuous and opening to opposite ends of the piston and stem, said stem being of reduced diameter to define, with the head-bore wall, an annular gas chamber which is in communication with the orifice when the valve member is out of seat-engaging position, there being a gas inlet to said chamber, an internal valve seat in the stem bore and there being a chamber in the stem above the seat; a second piston in the head bore and axially spaced from the first piston, the two pistons and the head-bore wall defining a liquid chamber, there being a liquid inlet opening to the liquid chamber, a stem carried by the second piston and slidable through the bores of the first piston and its stem, and a second valve member carried by the second stem and movable with respect to the first piston to and from a position engaging said internal seat, a spring acting normally and yieldingly to hold said second valve member in engagement with said internal seat, there being a passageway in the second stem opening at one point to said liquid chamber and at another point to said stem chamber.

5. In a machine of the character described, a filling head having a delivery orifice, there being a passageway in the head and in communication with the orifice, a valve seat in the passageway, the passageway being formed to include a head bore at the side of the seat remote from the orifice, a tubular piston movable axially through the bore, a tubular stem carried by said piston, a valve member on said stem, said piston and stem being movable to and from a position engaging said valve member with said seat, the bores of the piston and stem being axially continuous and opening to opposite ends of the piston and stem, said stem being of reduced diameter to define, with the head-bore wall, an annular gas chamber which is in communication with the orifice when the valve member is out of seat-engaging position, there being a gas inlet to said chamber, an internal valve seat in the stem bore and there being a chamber in the stem above the seat; a second piston in the head bore and axially spaced from the first piston, the two pistons and the head-bore wall defining a liquid chamber, there being a liquid inlet opening to the liquid chamber, a stem carried by the second piston and slidable through the bores of the first piston and its stem, a second valve member carried by the second stem and movable with respect to the first piston to and from a position engaging said internal seat, there being a passageway in the second stem opening at one point to said liquid chamber and at another point to said stem chamber, and a spring applied to the first piston and acting normally and yieldingly to hold both said valve members in engagement with their respective seats.

6. In a machine for filling a container with a liquid through a filling opening in the container, a filling head having an inlet and a delivery orifice, there being a passageway in the head connecting the inlet and the delivery orifice, said head being adapted to be associated with the container with the delivery orifice and filling opening in registration, a valve in said passageway to control liquid flow therethrough, means normally and yieldably holding said valve closed, a piston connected to the valve and exposed to liquid in said passageway whereby said liquid, under predetermined pressure, is effective to open said valve, a meter embodying a cylinder and a displacement plunger slidable through said cylinder, there being a check-valved liquid inlet opening to said cylinder, an outlet line from said cylinder and opening to said passageway, and means for reciprocating said plunger, alternately to draw liquid through the inlet into the cylinder and to pressurize the liquid in said passageway.

7. In a machine for filling a container with a liquid through a filling opening in the container, a filling head having an inlet and a delivery orifice, there being a passageway in the head connecting the inlet and the delivery orifice, said head being adapted to be associated with the container with the delivery orifice and filling opening in registration, a valve in said passageway to control liquid flow therethrough, means normally and yieldably holding said valve closed, a piston connected to the valve and exposed to liquid in said passageway whereby said liquid, under predetermined pressure, is effective to open said valve, a meter embodying a cylinder and a displacement plunger slidable through said cylinder, means for varying the displacement stroke of the plunger, there being a check-valved liquid inlet opening to said cylinder, an outlet line from said cylinder and opening to said passageway, and means for reciprocating said plunger, alternately to draw liquid through the inlet into the cylinder and to pressurize the liquid in said passageway.

8. In a machine for filling a container with a liquid through a filling opening in the container, a filling head having an inlet and a delivery orifice, there being a passageway in the head connecting the inlet and the delivery orifice, said head being adapted to be associated with the container with the delivery orifice and filling opening in registration, a valve in said passageway to control liquid flow therethrough, means normally and yieldably holding said valve closed, a piston connected to the valve and exposed to liquid in said passageway whereby said liquid, under predetermined pressure, is effective to open said valve, a meter embodying a cylinder and a displacement plunger slidable through said cylinder, there being a check-valved liquid inlet opening to said cylinder, an outlet line from said cylinder and opening to said passageway, means for reciprocating said plunger, alternately to draw liquid through the inlet into the cylinder and to pressurize the liquid in said passageway, and means operated by the last named means and acting to clear said orifice of liquid when said valve is subsequently closed.

9. In a machine for filling a container with a liquid through a filling opening in the container, a filling head having an inlet and a delivery orifice, there being a passageway in the head connecting the inlet and the delivery orifice, said head being adapted to be associated with the container with the delivery orifice and filling opening in registration, a valve in said passageway to control liquid flow therethrough, means normally and yieldably holding said valve closed, a piston connected to the valve and exposed to liquid in said passageway whereby said liquid, under predetermined pressure, is effective to open said valve, a meter embodying a cylinder and a displacement plunger slidable through said cylinder, there being a check-valved liquid inlet opening to said cylinder, an outlet line from said cylinder and opening to said passageway, means for reciprocating said plunger, alternately to draw liquid through the inlet into the cylinder and pressurize the liquid in said passageway, and means operated by the last named means and acting to expel gas through said orifice to clear it of liquid when said valve is subsequently closed.

10. In a machine for filling a container with a mixture of liquids through a filling opening in the container, a filling head having a plurality of inlets adapted to be individually connected with different liquid sources, said head also having a delivery orifice adapted to be associated with the container in a manner whereby the orifice and filling opening are in registration, there being a mixing chamber in the head and in communication with said inlets, and there being a passageway from said mixing chamber to said orifice, a valve in said passageway to control liquid flow therethrough, means normally and yieldably holding said valve closed, a piston connected to the valve and exposed to liquid in said mixing chamber whereby liquid in that chamber, and under predetermined pressure, is effective to open said valve, a pair of meters, each embodying a cylinder, a displacement plunger slidable through said cylinder and a check-valved inlet opening to the cylinder, an outlet line from one cylinder to one of the filling head inlets, and an outlet line from the other cylinder to the other filling head inlet, and means for simultaneously reciprocating said plungers.

11. In a machine for filling a container with a mixture of liquids through a filling opening in the container, a filling head having a plurality of inlets adapted to be individually connected with different liquid sources, said head also having a delivery orifice adapted to be associated with the container in a manner whereby the orifice and filling opening are in registration, there being a mixing chamber in the head and in communication with said inlets, and there being a passageway from said mixing chamber to said orifice, a valve in said passageway to control liquid flow therethrough, means normally and yieldably holding said valve closed, a piston connected to the valve and exposed to liquid in said mixing chamber whereby liquid in that chamber, and under predetermined pressure, is effective to open said valve, a pair of meters, each embodying a cylinder, a displacement plunger slidable through said cylinder and a check-valved inlet opening to the cylinder, an outlet line from one cylinder to one of the filling head inlets, and an outlet line from the other cylinder to the other filling head inlet, means for simultaneously reciprocating said plungers, and means for individually varying the displacement strokes of said plungers.

12. In a machine for filling a container with a mixture of liquids through a filling opening in the container, a filling head having a plurality of inlets adapted to be individually connected with different liquid sources, said head also having a delivery orifice adapted to be associated with the container in a manner whereby the orifice and filling opening are in registration, there being a mixing chamber in the head and in communication with said inlets, and there being a passageway from said mixing chamber to said orifice, a valve in said pasageway to control liquid flow therethrough, means normally and yieldably holding said valve closed, a piston connected to the valve and exposed to liquid in said mixing chamber whereby liquid in that chamber, and under predetermined pressure, is effective to open said valve, a pair of meters, each embodying a cylinder, a displacement plunger slidable through said cylinder, and a check-valved inlet opening to the cylinder, an outlet line from one cylinder to one of the filling head inlets, and an outlet line from the other cylinder to the other filling head inlet, and fluid pressure means for simultaneously reciprocating said plungers.

REUBEN STANLEY SMITH.

REFERENCES CITED

The following references are of record in the file of this patent:

UNITED STATES PATENTS

| Number | Name | Date |
| --- | --- | --- |
| 732,678 | Ford | June 30, 1903 |
| 976,751 | Schneider | Nov. 22, 1910 |
| 1,135,653 | Bartlett | Apr. 13, 1915 |
| 1,252,881 | Calleson | Jan. 8, 1918 |
| 1,435,300 | Holmquist | Nov. 14, 1922 |
| 1,860,270 | Thubron | May 24, 1932 |
| 1,868,444 | Bechtold | July 19, 1932 |
| 1,962,161 | Thompson | June 12, 1934 |
| 2,041,735 | Young | May 26, 1936 |
| 2,080,566 | Ginter et al. | May 18, 1937 |
| 2,112,199 | Kantor | Mar. 22, 1938 |
| 2,118,436 | Kantor | May 24, 1938 |

FOREIGN PATENTS

| Number | Country | Date |
| --- | --- | --- |
| 572,926 | France | Mar. 1, 1924 |